(12) United States Patent
Yang et al.

(10) Patent No.: US 10,523,372 B2
(45) Date of Patent: Dec. 31, 2019

(54) METHOD AND APPARATUS FOR THE TRANSMISSION OF UPLINK CONTROL INFORMATION

(71) Applicant: ZTE CORPORATION, Guangdong (CN)

(72) Inventors: Weiwei Yang, Guangdong (CN); Bo Dai, Guangdong (CN); Chunli Liang, Guangdong (CN); Zhaohua Lu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 15/764,261

(22) PCT Filed: Feb. 28, 2017

(86) PCT No.: PCT/CN2017/075235
§ 371 (c)(1),
(2) Date: Mar. 28, 2018

(87) PCT Pub. No.: WO2017/121416
PCT Pub. Date: Jul. 20, 2017

(65) Prior Publication Data
US 2019/0058552 A1    Feb. 21, 2019

(30) Foreign Application Priority Data

Jan. 11, 2016  (CN) .......................... 2016 1 0015475
Feb. 5, 2016  (CN) .......................... 2016 1 0082210

(51) Int. Cl.
*H04L 1/18*   (2006.01)
*H04W 76/27*  (2018.01)
(Continued)

(52) U.S. Cl.
CPC ....... *H04L 1/1812* (2013.01); *H04B 10/5561* (2013.01); *H04L 5/0007* (2013.01); *H04W 76/27* (2018.02)

(58) Field of Classification Search
CPC ... H04L 1/1812; H04L 5/0007; H04L 1/1864; H04L 1/1854; H04L 1/1861; H04L 1/18; H04W 76/27; H04B 10/5561
See application file for complete search history.

(56) References Cited

U.S. PATENT DOCUMENTS

| | | | | |
|---|---|---|---|---|
| 7,957,394 B1* | 6/2011 | Cohen | ................. | H04L 41/0806 370/230.1 |
| 2008/0144561 A1* | 6/2008 | Kaikkonen | ............... | H04L 1/06 370/315 |

(Continued)

FOREIGN PATENT DOCUMENTS

| | | |
|---|---|---|
| CN | 102144424 A | 8/2011 |
| WO | 2015/103722 A1 | 7/2015 |

OTHER PUBLICATIONS

Official Action issued in corresponding Chinese Patent Application No. 2016100822109.
(Continued)

*Primary Examiner* — Mohamed A Kamara
(74) *Attorney, Agent, or Firm* — Duane Morris LLP

(57) ABSTRACT

Embodiments of the present disclosure provide a method and apparatus for the transmission of uplink control information, wherein this method comprises: receiving downlink information and using a predefined physical uplink shared channel (PUSCH) format to transmit a hybrid automatic repeat request-acknowledgment (HARQ-ACK) corresponding to the downlink information. The implementation of the present invention solves the problem in prior art of not being
(Continued)

able to transmit HARQ-ACK on the PUSCH through its ability to transmit HARQ-ACK on the PUSCH.

11 Claims, 12 Drawing Sheets

(51) Int. Cl.
*H04B 10/556* (2013.01)
*H04L 5/00* (2006.01)

(56) References Cited

U.S. PATENT DOCUMENTS

| | | | |
|---|---|---|---|
| 2011/0194516 A1 | 8/2011 | Aiba et al. | |
| 2012/0243497 A1 | 9/2012 | Chung et al. | |
| 2013/0121271 A1 | 5/2013 | Chen et al. | |
| 2013/0148593 A1* | 6/2013 | Suzuki | H04L 5/0051 370/329 |
| 2015/0289259 A1 | 10/2015 | Yang et al. | |
| 2016/0081122 A1* | 3/2016 | Tang | H04L 5/0055 370/329 |
| 2017/0265207 A1* | 9/2017 | Takeda | H04W 28/04 |

OTHER PUBLICATIONS

Partial supplementary Search Report dated Feb. 5, 2019, in corresponding European Patent Application No. 17738229.8.
ZTE, "Uplink HARQ-ACK transmission for NB-IoT", 3GPP TSG RAN WG1 NB-IoT Ad-Hoc Meeting, Budapest, Hungary, Jan. 2016, R1-18055, pp. 1-3.
"3rd Generation Partnership Project; Technical Specification Group Radio Access Network: Evolved Universal Terrestrial Radio Access (E-UTRA); Multiplexing and Channel Coding (Release 12)", 3GPP TS 36.212 V 12.4.0, 2015, Chapter 5.2.2.6.
International Search Report dated May 17, 2017, in corresponding International Application No. PCT/CN2017/075235.

* cited by examiner

METHOD AND APPARATUS FOR THE TRANSMISSION OF UPLINK CONTROL INFORMATION

TECHNICAL FIELD

Embodiments of the present disclosure generally relate to the field of Communications, and more specifically to a method and apparatus for the transmission of uplink control information.

Background Techniques Machine Type Communications (MTC), also called Machine to Machine (M2M), are, at this stage, the primary form of application for the Internet of things. The MTC equipment that the current market deploys is mainly based on Global System of Mobile Communications (GSM). In recent years, due to the high spectral efficiency of Long-Term Evolution (LTE)/Long-Term Evolution Advanced (LTE-A), more and more mobile operators are choosing LTE/LTE-A for the future of broadband wireless communication systems. Much LTE/LTE-A-based MTC technology will also become more attractive. The coverage for MTC User Equipment (MTC UE) in the requirements of the related art ought to be strengthened, along with its reuse capacity, as the volume of MTC UE is relatively large. For MTC UE, the current consensus is that uplink only supports physical uplink shared channel (PUSCH) transmission. There is no technique in the related art, however, that uses the PUSCH format to transmit only the uplink control information HARQ-ACK corresponding to the downlink information.

There has not yet been a solution that solves the problem in the related art of not being able to transmit HARQ-ACK on the PUSCH.

Contents of the Present Embodiments

Embodiments of the present disclosure provide a method and apparatus for the transmission of uplink control information, and, at the very least, solve the problem in the related art of not being able to transmit HARQ-ACK on the PUSCH.

One aspect of the present embodiments provides a method to transmit uplink control information, which comprises: receiving downlink information; utilizing the predefined PUSCH format to transmit HARQ-ACK corresponding to the downlink information.

Alternatively, when only HARQ-ACK is transmitted, the encoding mode within the PUSCH format is repetition coding.

Alternatively, when only HARQ-ACK is transmitted, the modulation mode within the PUSCH format is preset binary phase-shift keying (BPSK) modulation or quadrature phase-shift keying (QPSK) modulation.

Alternatively, the preset BPSK comprises: first position element modulations with a constellation point of $\{1, -1\}$, and second position element modulations with a constellation point of $\{j, -j\}$, wherein the first position elements comprise elements with an even-numbered position in the modulation sequence, and the second position elements comprise elements with an odd-numbered position in the modulation sequence, or wherein the first position elements comprise elements with an odd-numbered position in the modulation sequence, and the second position elements comprise elements with an even-numbered position in the modulation sequence.

Alternatively, when only HARQ-ACK is transmitted, the PUSCH format has a time domain of X milliseconds (ms) and the frequency domain of a single subcarrier.

Alternatively, the value of the X is predetermined, wherein that predetermined value is 2 ms, 3 ms, or 4 ms; or the value of X may be larger than 1 ms and a multiple or divisor of 12; or, the value of X may correspond to the shortest time domain length of the physical downlink shared channel (PDSCH); or, the value of X may be the shortest time domain length of the PUSCH that is only transmitting data; or, the value of X may correspond to the shortest time domain length for single carrier PUSCH transmission; or, the value of X may be the value indicated by the signaling, wherein such signaling include at least one of the following: system information block (SIB) signaling; radio resource control (RRC) signaling; DCI corresponding to the PUSCH; DCI corresponding to the PDSCH.

Alternatively, the frequency domain position of a single subcarrier is predetermined or is indicated by the signaling, wherein such signaling include at least one of the following: SIB signaling; RRC signaling; DCI corresponding to the PUSCH; DCI corresponding to the PDSCH.

Alternatively, when HARQ-ACK and scheduling request (SR) are simultaneously transmitted, PUSCH will first concatenate HARQ-ACK and SR before encoding them.

Alternatively, when HARQ-ACK and SR are simultaneously transmitted, PUSCH will employ the first scrambling sequence; when only HARQ-ACK is transmitted, PUSCH will employ the second scrambling sequence.

Alternatively, when HARQ-ACK and uplink data are simultaneously transmitted, the PUSCH channels are interleaved: the encoded HARQ-ACK sequence is mapped to a predefined position on the channel interleaving matrix according to the order of column then row; or, the encoded HARQ-ACK sequence is mapped to a predefined position on the interleaving matrix according the order of row then column.

Alternatively, the mapping of the encoded HARQ-ACK sequence to a predefined position on the interleaving matrix in the order of column then row comprises: starting at the Y column and using the order of column then row to map the HARQ-ACK sequence to a predefined position on the interleaving matrix, wherein Y is an integer greater than or equal to 0.

Alternatively, the mapping of the encoded HARQ-ACK sequence to a predefined position on the interleaving matrix in the order of row then column comprises: starting at the Z column and using the order of row then column to map the encoded HARQ-ACK sequence to a predefined position on the interleaving matrix, wherein Z is an integer greater than or equal to 0.

Alternatively, the predefined position is the column $\{K(j')+12*i\}$ within the interleaving matrix within the PUSCH format, wherein the columns are positive integers, and i and j' are integers greater than or equal to 0.

Alternatively, the value of i is equal to 0, 1, ..., N−1; or, i is equal to 0, cell (N/2), 1, cell(N/2)+1,2, cell(N/2)+2, ..., cell (N/2)−1, N−1; or, i is equal to 0, 1, ..., N−1 of any value; N is equal to the number of orthogonal frequency division multiplexing (OFDM) symbols corresponding to the PUSCH format divided by 12 and then rounded up to the next whole integer; the value of K (j') is equal to 2, 3, 8, 9, wherein the value of j' is 1, 2, 3, 4 or, 1, 3, 2, 4; or the value of K (j') is equal to 1, 2, 3, 4, 5, 6, wherein the value of j' is 1, 2, 3, 4, 5, 6; or the value of K (j') is equal to 1, 2, 3, 4, 5, 6, 7, 8, 9, 10, 11, 12, wherein the value j' is 1, 2, 3, 4, 5, 6, 7, 8, 9, 10, 11, 12.

Alternatively, receiving downlink information comprises: receiving downlink information in the downlink subframe {n, . . . , n+M}; using a predefined PUSCH format to transmit a HARQ-ACK corresponding to the downlink information, which comprises: transmitting the HARQ-ACK corresponding to the downlink information in the uplink subframe {k, . . . , k+X−1}, wherein n is an integer equal to or greater than 0, and M is an integer greater than or equal to 0.

Alternatively, the value of k comprises one of the following: k=n+4*X; k=n+M+4; the value of k is determined by at least one of the following: the scheduling window of the downlink information, the position of the downlink information within the scheduling window, the signaling configuration.

Alternatively, the preset subframe index corresponding to the uplink subframe k is an integer multiple of X.

Alternatively, when the value of k is determined by the scheduling window of the downlink information, and the downlink information is at scheduling window t, the uplink subframe k is located at scheduling window t+2; or, when the value of k is determined by the scheduling window of the downlink information, and the downlink information is at scheduling window t, the uplink subframe k is located at scheduling window t+1; or, when the value of k is determined by the scheduling window of the downlink information and the position of subframe n+M within the scheduling window, if the position of subframe n+M is located before subframe L in scheduling window t, then the uplink subframe k is located at scheduling window t+1, or else it is located at scheduling window t+2; wherein t is an integer greater than or equal to 0, and L is a preset positive integer.

Alternatively, the uplink subframe k that is located within the scheduling window comprises: k is a subframe corresponding to the start of the scheduling window; or, k is composed of a subframe corresponding to the start of the scheduling window plus the first offset, wherein the first offset is determined by at least one of the following: the position of the downlink information within the scheduling window, the value of X, or the second offset, with the second offset being configured by signaling.

Another aspect of the present embodiments provides an apparatus for the transmission of uplink control information, which comprises: a receiver module configured to receive downlink information; a transmitter module configured to use the predefined PUSCH format to transmit a HARQ-ACK corresponding to the downlink information.

Another aspect of the present embodiments provide a computer storage medium, wherein the computer storage medium stores execution instructions, wherein such execution instructions are used to implement one of the steps listed in the methods of the present embodiments or a combination thereof.

The implementation of the current embodiments comprises receiving downlink information, using the predefined PUSCH format to transmit a HARQ-ACK corresponding to the downlink information; the present invention thereby solves the problem in prior art of not being able to transmit HARQ-ACK on the PUSCH format.

BRIEF DESCRIPTION OF THE DRAWINGS

The drawings described herein are provided in the interest of deepening the understanding of the current embodiments, and constitute one part of this application. The present invention's illustrative embodiments and the explanations thereof are provided to further explain the present invention, and do not serve to limit it. The drawings:

Figure 7:
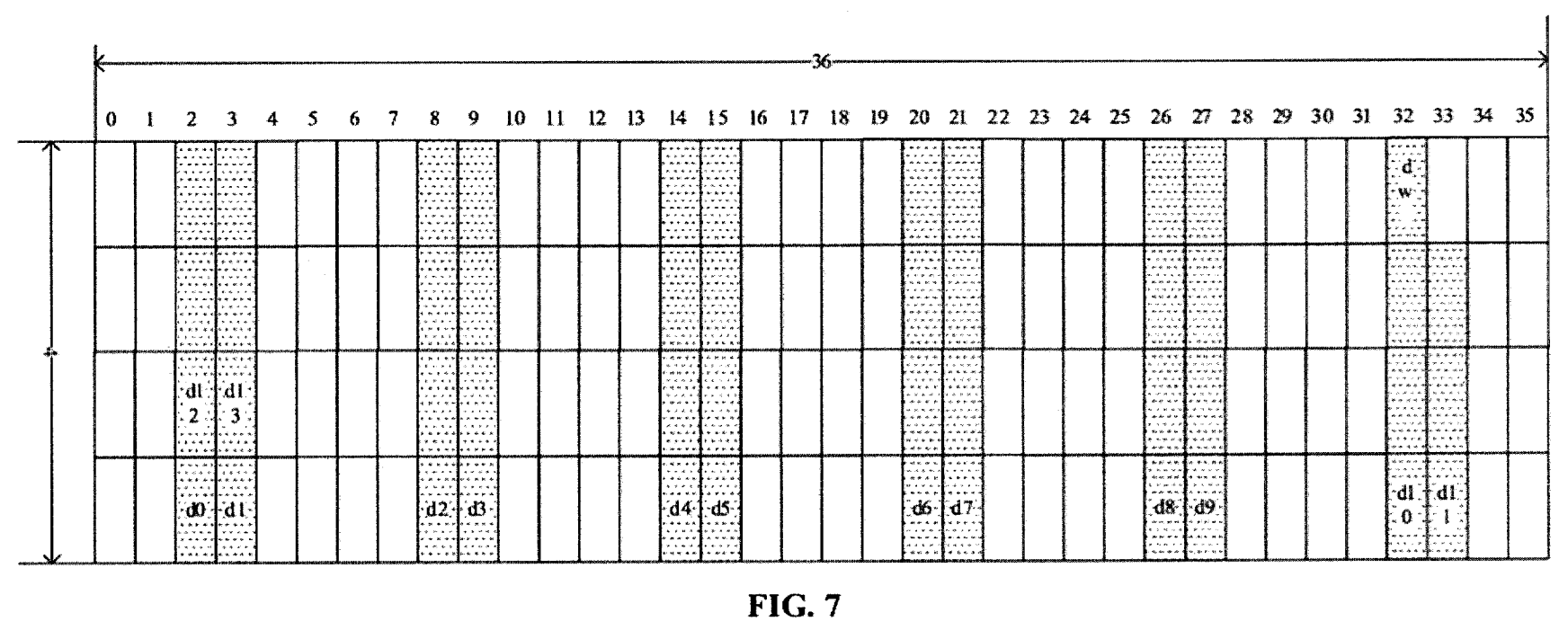

FIG. 7 is schematic diagram (2) based on the HARQ-ACK sequence mapping in the present embodiments;

Figure 8:
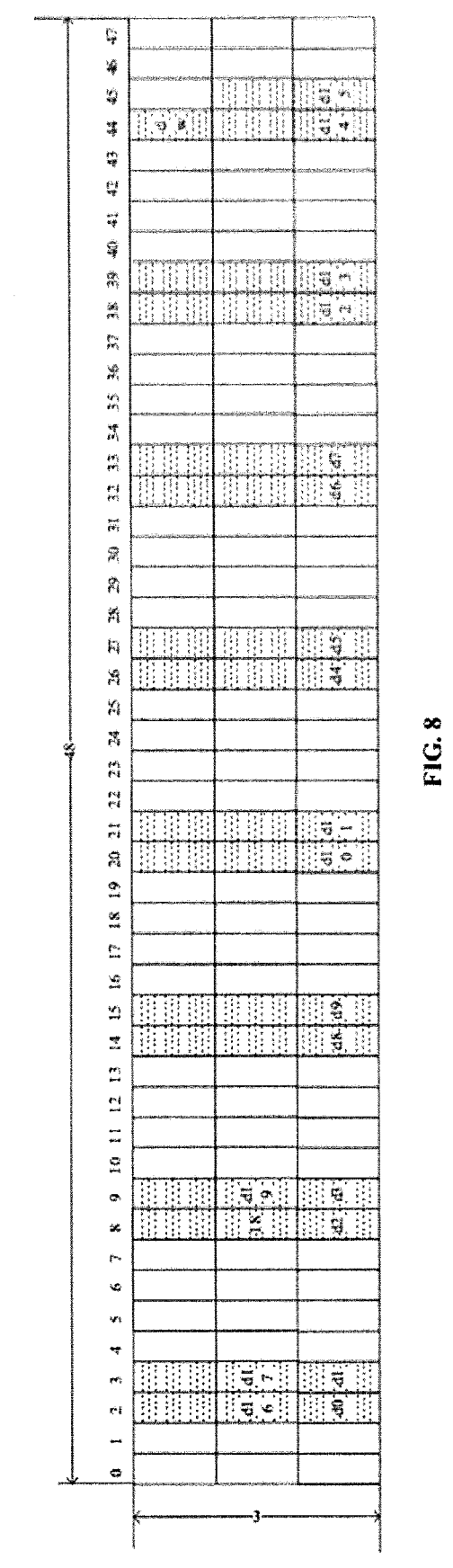

FIG. 8 is schematic diagram (3) based on the HARQ-ACK sequence mapping in the present embodiments;

DETAILED DESCRIPTION

This document will hereinafter reference the drawings and describe the present embodiments in detail. It should be noted that the embodiments of the present disclosure and the features thereof can be combined in a non-conflicting manner.

It should be noted that terminology like "first", "second", etc., in the description and claims of the present embodiments and the accompanying drawings are used only to distinguish like objects, and do not serve to describe any sequence or pattern.

Figure 1:
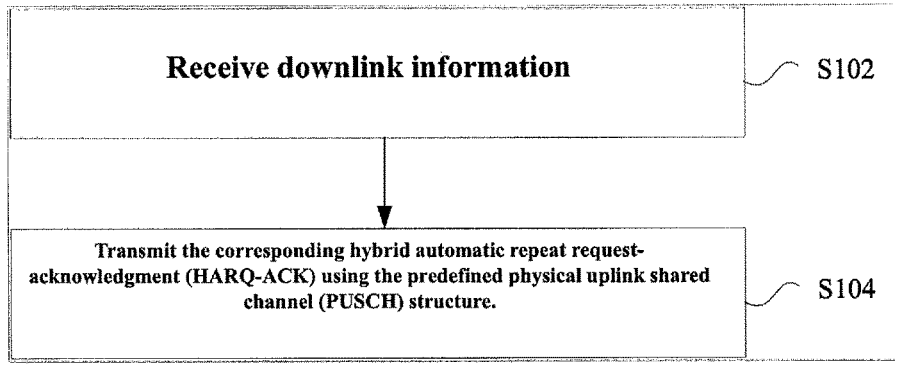
FIG. 1 is a flowchart describing the method of uplink control information transmission outlined in the present embodiments.

The present embodiments provide a method for the transmission of uplink control information. FIG. 1 is a flowchart based the method of uplink control information transmission outlined in the present embodiments; as shown in FIG. 1, this method comprises the following steps:

Step S102, receive the downlink information;

Step S104, utilize the predefined PUSCH format to transmit a HARQ-ACK corresponding to the downlink information.

Wherein, the implementer of the actions in the present embodiments can be a terminal; after the terminal receives the downlink information, the terminal can utilize the predefined PUSCH format to transmit a HARQ-ACK corresponding to the downlink information received.

According to the embodiments, the terminal will use the PUSCH format when transmitting HARQ-ACK. From this, the embodiments of the present disclosure provide a method for transmitting HARQ-ACK on the PUSCH, and thus solve the problem in the prior art of not being able to transmit HARQ-ACK on the PUSCH.

The PUSCH format can comprise many formats. An explanation of the distinction between various PUSCH formats is provided below:

In an alternative embodiment, when only HARQ-ACK is transmitted, the encoding mode within the PUSCH format is repetition code.

In another alternative embodiment, when only HARQ-ACK is transmitted, the modulation mode within the PUSCH format is preset binary phase-shift keying (BPSK) modulation or quadrature phase-shift keying (QPSK) modulation.

Alternatively, the preset BPSK modulation can comprise of: first position element modulations with a constellation point of $\{1, -1\}$, and second position element modulations with a constellation point of $\{j, -j\}$, wherein the first position elements comprise elements with an even-numbered position in the modulation sequence, and the second position elements comprise elements with an odd-numbered position in the modulation sequence, OR wherein the first position elements comprise elements with an odd-numbered position in the modulation sequence, and the second position elements comprise elements with an even-numbered position in the modulation sequence.

In another alternative embodiment, when only HARQ-ACK is transmitted, the PUSCH format has a time domain of X ms and the frequency domain of a single subcarrier.

Alternatively, the value of the X is predetermined, wherein that predetermined value is 2 ms, 3 ms, or 4 ms; or larger than 1 ms and a multiple or divisor of 12; or, corresponding to the shortest time domain length of the physical downlink shared channel (PDSCH); or, the shortest time domain length of the PUSCH that is only transmitting data; or, corresponding to the shortest time domain length for single carrier PUSCH transmission; or, the value of the signaling indicators, wherein such signaling indicators include at least one of the following: system information block (SIB) signaling; radio resource control (RRC) signaling; DCI corresponding to the PUSCH; DCI corresponding to the PDSCH.

The frequency domain position of a single subcarrier is predetermined; or is indicated by the signaling indicators, wherein such signaling indicators include at least one of the following: SIB signaling; RRC signaling; DCI corresponding to the PUSCH; DCI corresponding to the PDSCH.

Alternatively, when HARQ-ACK and scheduling request (SR) are simultaneously transmitted, PUSCH will first concatenate HARQ-ACK and SR before encoding them.

Alternatively, when HARQ-ACK and SR are simultaneously transmitted, PUSCH will employ the first scrambling sequence; when only HARQ-ACK is transmitted, PUSCH will employ the second scrambling sequence.

Alternatively, when HARQ-ACK and uplink data are simultaneously transmitted, the PUSCH channels are interleaved: the encoded HARQ-ACK sequence is mapped to a predefined position on the channel interleaving matrix according to the order of column then row; or, the encoded HARQ-ACK sequence is mapped to a predefined position on the interleaving matrix according the order of row then column.

Alternatively, the mapping of the encoded HARQ-ACK sequence to a predefined position on the interleaving matrix in the order of column then row comprises: starting at the Y column and using the order of column then row to map the HARQ-ACK sequence to a predefined position on the interleaving matrix, wherein Y is an integer greater than or equal to 0.

Alternatively, the mapping of the encoded HARQ-ACK sequence to a predefined position on the interleaving matrix in the order of row then column comprises: starting at the Z column and using the order of row then column to map the encoded HARQ-ACK sequence to a predefined position on the interleaving matrix, wherein Z is an integer greater than or equal to 0.

Alternatively, the predefined position is the column (K(j')+12*i) within the interleaving matrix within the PUSCH format, wherein the columns are positive integers, and i and j' are integers greater than or equal to 0.

Alternatively, the value of i is equal to 0, 1, . . . , N−1; or, i is equal to 0, cell (N/2), 1, cell(N/2)+1,2, cell(N/2)+2, . . . , cell (N/2)−1, N−1; or, i is equal to 0, 1, . . . , N−1 of any value; N is equal to the number of orthogonal frequency division multiplexing (OFDM) symbols corresponding to the PUSCH format divided by 12 and then rounded up to the next whole integer; the value of K (j') is equal to 2, 3, 8, 9, wherein the value of j' is 1, 2, 3, 4 or, 1, 3, 2, 4; or the value of K (j') is equal to 1, 2, 3, 4, 5, 6, wherein the value of j' is 1, 2, 3, 4, 5, 6; or the value of K (j') is equal to 1, 2, 3, 4, 5, 6, 7, 8, 9, 10, 11, 12, wherein the value j' is 1, 2, 3, 4, 5, 6, 7, 8, 9, 10, 11, 12.

It should be noted that the types of PUSCH formats comprise only a few examples; PUSCH formats can be defined based on specific circumstances, and are not enumerated exhaustively herein.

Alternatively, receiving downlink information comprises: receiving downlink information in the downlink subframe $\{n, \ldots, n+M\}$; using a predefined PUSCH format to transmit a HARQ-ACK corresponding to the downlink information, which comprises: transmitting the HARQ-ACK corresponding to the downlink information in the uplink subframe $\{k, \ldots, k+X-1\}$, wherein n is an integer equal to or greater than 0, and M is an integer greater than or equal to 0.

Alternatively, the value of k comprises one of the following: k=n+4*X; k=n+M+4; the value of k is determined by at least one of the following: the scheduling window of the downlink information, the position of the downlink information within the scheduling window, the signaling configuration.

Alternatively, the preset subframe index corresponding to the uplink subframe k is an integer multiple of X.

Alternatively, when the value of k is determined by the scheduling window of the downlink information, and the downlink information is at scheduling window t, the uplink subframe k is located at scheduling window t+2; or, when the value of k is determined by the scheduling window of the downlink information, and the downlink information is at scheduling window t, the uplink subframe k is located at scheduling window t+1; or, when the value of k is determined by the scheduling window of the downlink information and the position of subframe n+M within the scheduling window, if the position of subframe n+M is located before subframe L in scheduling window t, then the uplink subframe k is located at scheduling window t+1, or else it is located at scheduling window t+2; wherein, t is an integer greater than or equal to 0, and L is a preset positive integer.

Alternatively, the uplink subframe k that is located within the scheduling window comprises: k is a subframe corresponding to the start of the scheduling window; or, k is composed of a subframe corresponding to the start of the scheduling window plus the first offset, wherein the first offset is determined by at least one of the following: the position of the downlink information within the scheduling window, the value of X, or the second offset, with the second offset being configured by signaling.

The present embodiments will now be explained using specific examples:

EXAMPLE 1

This example primarily explains the transmission of uplink control information in the related art.

Ex. 1, Embodiment 1

Figure 2:
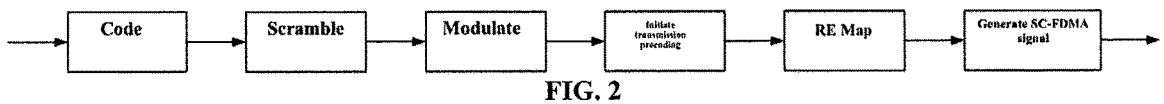
FIG. 2 describes the processing of PUSCH in the LTE system of related art.

FIG. 2 describes the processing of PUSCH in the LTE system of related art; as FIG. 2 shows, when processing is implemented, the data encoding, scrambling, modulation, transmission precoding, and resource unit mapping will need to be transmitted before the generation of a single carrier frequency-division multiple access (SC-FDMA) symbol transmission.

Ex. 1, Embodiment 2

Figure 3:
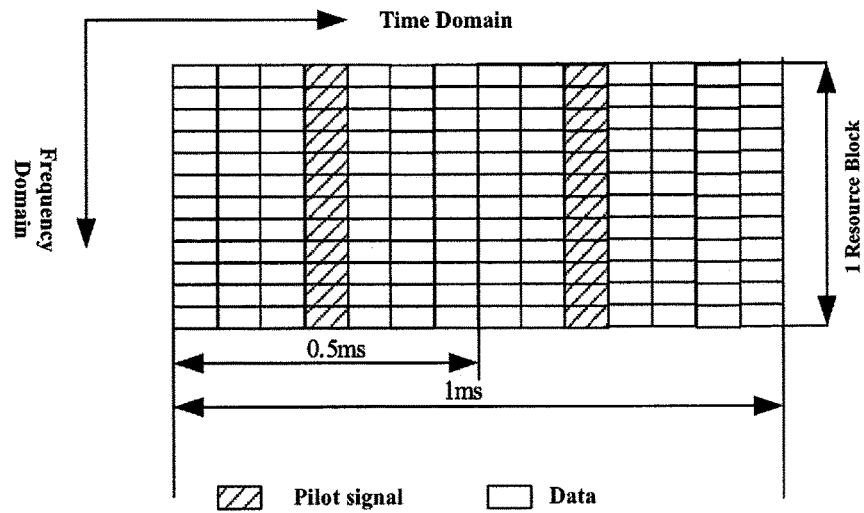
FIG. 3 is a mapping diagram of a time-frequency domain of PUSCH data and uplink demodulation reference signal during the conventional cyclic prefix in the LTE system of related art.

FIG. 3 is a mapping diagram of a time-frequency domain of PUSCH data and uplink demodulation reference signal during the conventional cyclic prefix in the LTE system of related art, wherein it is supposed that frequency hopping between time slots is not enabled, and that there is one physical resource block (PRB) in the frequency domain.

Ex. 1, Embodiment 3

Figure 4:
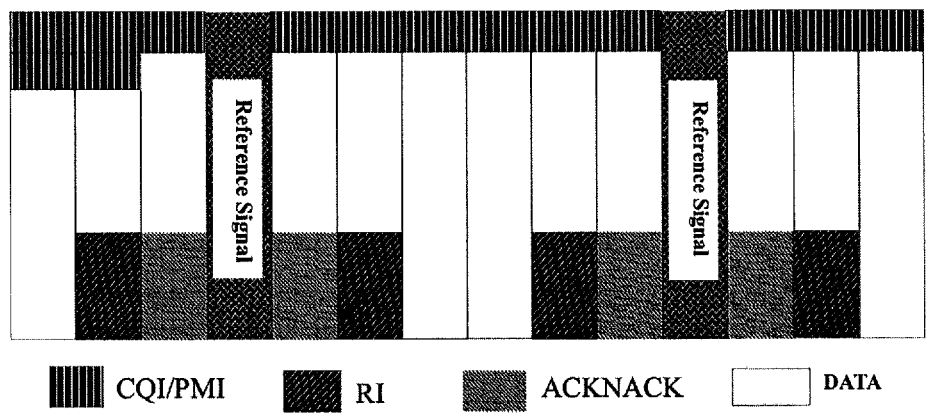
FIG. 4 is a mapping location diagram of uplink control information when it is transmitted on PUSCH in the LTE system of related art.

FIG. 4 is a mapping location diagram of uplink control information when it is transmitted on PUSCH in the LTE system of related art, wherein the HARQ-ACK response symbol is mapped onto both sides of the uplink demodulation reference signal.

Ex. 1, Embodiment 4

Figure 5:
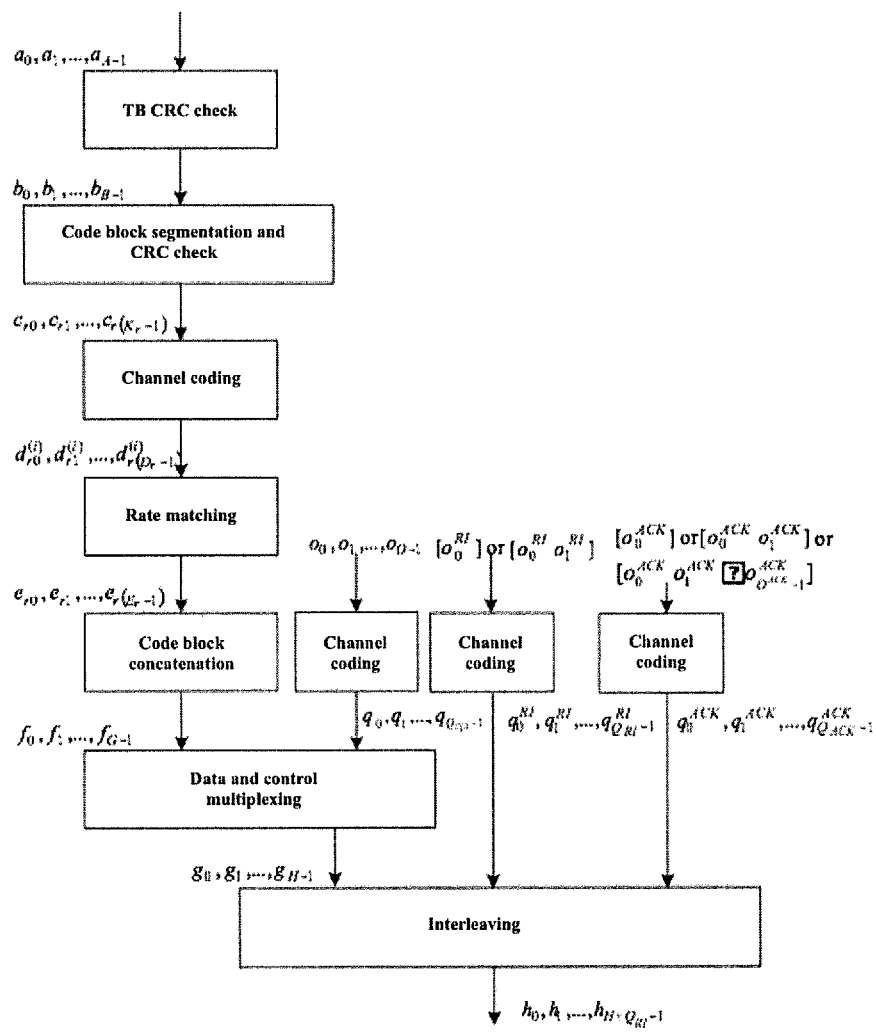
FIG. 5 is a channel coding process diagram describing when uplink control information and uplink data are multiplexed in the LTE system of related art.

FIG. 5 is a channel coding process diagram describing when uplink control information and uplink data are multiplexed in the LTE system of related art. Uplink data takes the form of a Transport Block (TB) when it is transmitted; after TB has undergone cyclic redundancy check (CRC) attachment, code block segmentation, code block CRC attachment, channel coding, rate matching, and code block concatenation, and after encoding of CQI/PMI, the multiplexing of uplink data and control signaling is i; finally, the encoded HARQ-ACK response information, the RI signaling, and the data are multiplexed together through channel interleaving, wherein the coding process for the uplink control signaling is as follows: first, relevant information such as TB block size is used to calculate the target length for the uplink control signaling transmission, after which channel coding is performed, with the encoded information bits denoted as $[q_0^{ACK}, q_1^{ACK}, q_2^{ACK}, \ldots, q_{Q_{ACK}-1}^{ACK}]$, $[q_0^{CQI}, q_1^{CQI}, q_2^{CQI}, \ldots, q_{Q_{CQI}-1}^{CQI}]$, $[q_0^{RI}, q_1^{RI}, q_2^{RI}, \ldots, q_{Q_{RI}-1}^{RI}]$; wherein multiplexing the uplink data and the control signaling is cascading the encoded CQI/PMI information and data in the form of modulation symbol, denoted as $[g_0^i, g_1^i, g_2^i, \ldots, g_{H'_i-1}^i]$. The channel interleaving process is to write the encoded ACK/NACK information bits $[q_0^{ACK}, q_1^{ACK}, q_2^{ACK}, \ldots, q_{Q_{ACK}-1}^{ACK}]$, the RI information bits, $[q_0^{RI}, q_1^{RI}, q_2^{RI}, \ldots, q_{Q_{RI}-1}^{RI}]$, as well as the $[g_0^i, g_1^i, g_2^i, \ldots, g_{H'_i-1}^i]$ after data and control multiplexing into a virtual matrix according to a certain order, and then read out the virtual matrix according to the order of from row to column, thereby ensuring that in the subsequent process of mapping the modulation symbols to the physical resources, the HARQ-ACK response information, RI, CQI/PMI, and data can be mapped to the locations shown in FIG. 4, respectively. The specific process of channel interleaving is as follows:

(1) first generate a virtual matrix, wherein the size of the virtual matrix is related to PUSCH resource allocation.

(2) According to the order of first writing into the columns and then writing into the rows of the virtual matrix, and writing from the last row to the first row, write encoded RI information bits $[q_0^{RI}, q_1^{RI}, q_2^{RI}, \ldots, q_{Q_{RI}-1}^{RI}]$ with the form of modulation symbols into preset positions for the RI information in the virtual matrix.

(3) Start from the position of the first row and the first column of the virtual matrix, and according to the order of first column then row, write $[g_0^i, g_1^i, g_2^i, \ldots, g_{H^{*}i-1}^i]$ into the virtual matrix; when writing, skip the positions into which RI information has already been written.

(4) According to the order of first writing into the columns and then writing into the rows of the virtual matrix, and writing from the last row to the first row, write encoded ACK/NACK information bits $[q_0^{ACK}, q_1^{ACK}, q_2^{ACK}, \ldots, q_{Q_{ACK}-1}^{ACK}]$ in the form of modulation symbols into the preset ACK/NACK information positions in the virtual matrix; when writing, if any location already has been written in with $[g_0^i, g_1^i, g_2^i, \ldots, g_{H'_i-1}^i]$, then puncture the data symbol in that position.

(5) Finally, read out the virtual matrix according to the order of first row then column to obtain the interleaved sequence in the form of modulation symbols $h_0, h_1, h_2, \ldots, h_{H+Q_{RI}-1}$.

Wherein the preset positions of the RI information and the ACK/NACK response message are as shown in Table 1 and Table 2, wherein Table 1 shows the column set for writing RI information, and Table 2 shows the column set for writing ACK/NACK information:

TABLE 1

| Cyclic Prefix Configuration | Column Set |
| --- | --- |
| Regular cyclic prefix | {1, 4, 7, 10} |
| Extended cyclic prefix | {0, 3, 5, 8} |

TABLE 2

| Cyclic Prefix Configuration | Column Set |
|---|---|
| Regular cyclic prefix | {2, 3, 8, 9} |
| Extended cyclic prefix | {1, 2, 6, 7} |

EXAMPLE 2

The present embodiment and embodiments 3 through 6 describe the methods of the present embodiments:

In the present embodiment, suppose that the HARQ-ACK response information that must be transmitted is $a_0$.

Ex. 2, Embodiment 1

Transmitting on the PUSCH, use repetition code to obtain the encoded sequence $[b_0, b_1, \ldots, b_B]$, wherein B is determined by the modulation order and the number of symbols in the time domain;

Ex. 2, Embodiment 2

Transmitting on the PUSCH, scramble encoded sequences using the second scrambling sequence, wherein the initial value for the second scrambling sequence is $n_{RNTI} \cdot 2^{14} + q \cdot 2^{13} + \lfloor n_s/2 \rfloor * 2^9 + N_{ID}^{CELL}$, wherein q is equal to 0; or, suppose that only data is transmitted on the PUSCH, and the corresponding initial value for the third scrambling sequence is $n_{RNTI} \cdot 2^9 + N_{ID}^{CELL}$, then the initial value for the second scrambling sequence is also $n_{RNTI} \cdot 2^9 + N_{ID}^{CELL}$; or, suppose that only data is transmitted on the PUSCH, and the corresponding initial value for the fourth scrambling sequence is $n_{RNTI} \cdot 2^{14} + \lfloor n_s/2 \rfloor * 2^9 + N_{ID}^{CELL}$, then the initial value for the second scrambling sequence is also $n_{RNTI} \cdot 2^{14} + \lfloor n_s/2 \rfloor * 2^9 + N_{ID}^{CELL}$, wherein $n_{RNTI}$ is equal to the RNTI value corresponding to PUSCH transmission, $N_{ID}^{CELL}$ is the cell index, $n_s$ is equal to the first time slot index of the PUSCH transmission; specific scrambling methods are identical to existing mechanisms, and will not be described further;

Ex. 2, Embodiment 3

Transmitting on the PUSCH, use predefined BPSK or QPSK modulation methods, wherein using predefined BPSK means that the constellation point corresponding to the odd-numbered element in the scrambled sequence is [1, −1] and that the constellation point corresponding to the even-numbered element is [j, −j];

Ex. 2, Embodiment 4

Transmitting on the PUSCH, map HARQ-ACK to the time domain X subframes, with a frequency domain of a single subcarrier; wherein, the value of X is a predetermined value, or is a value indicated by signaling; optimally, the signaling can include at least one of the following: SIB signal, RRC signal indication, or by the time domain indication field of the UL DCI signal indication corresponding to the PUSCH; wherein X is equal to the smallest time domain unit corresponding to the HARQ-ACK transmission, where the length of the time domain corresponding to the transmission is S*X, wherein S is an integer greater than 0, and S varies according to different coverage levels in the terminal; or, the value of X is the smallest time domain length corresponding to the PDSCH, or is the smallest time domain length of the PUSCH when only data is transmitted, or is the smallest time domain length corresponding to single carrier PUSCH transmission; optimally, when the subcarrier spacing is 15 kHz, the smallest time domain length is 8, and when the subcarrier spacing is 3.75 kHz, the smallest time domain length is 32.

The single subcarrier frequency domain position is predetermined, optimally at both ends of the frequency band, or at a position indicated by signaling; optimally, undergoing SIB signal indication, RRC signal indication, or DCI signal indication; or when DCI signal becomes DL DCI, through DL DCI resource field indication, or through DL DCI subframes, or through the index implied indication of the control channel elements (CCE) corresponding to DL DCI, or through CCE index joint instructions corresponding to the DL DCI resource indication field and the DL DCI; resource indication field values vary according to different coverage levels in the terminal; for example, the resource indication field value corresponding to non-coverage enhanced terminals is [A1, A2, A3, A4], and the resource indication field value corresponding to coverage/enhanced terminals is [B1, B2, B3, B4];

For example, when the frequency domain position of a single subcarrier has been indicated by the DL DCI resource field indication, the size of the resource indication field is determined by one or more of the following: the system bandwidth, the subcarrier spacing, the number of frequency domain resources in the HARQ-ACK transmission. Or, for example, supposing that the number of frequency domain resources in the HARQ-ACK transmission is 4, then the resource indication field is 2 bits.

Wherein, if the downlink information is an Msg4 message in a contention-based random access process, the resources corresponding to the HARQ-ACK have been indicated by DCI.

EXAMPLE 3

Suppose that the HARQ-ACK response information that must be transmitted is $a_0$, and SR must be transmitted simultaneously.

Ex. 3, Embodiment 1

Using the PUSCH format, encode HARQ-ACK and SR after concatenation;

Ex. 3, Embodiment 2

Using the PUSCH format, begin scrambling with the first scrambling sequence; specifically, the scrambling method is identical to existing mechanisms, and will not be discussed further; wherein the initial value for the first scrambling method is $n_{RNTI} \cdot 2^{14} + q \cdot 2^{13} + \lfloor n_s/(2*M) \rfloor * 2^9 + N_{ID}^{CELL}$, wherein the value of q is 1; specifically, the scrambling method is identical to existing technique, and will not be discussed further.

EXAMPLE 4

Ex. 4, Embodiment 1

Suppose that if HARQ-ACK and uplink data are simultaneously transmitted, the modulation sequence corresponding to HARQ-ACK is $\{d_0, d_1, d_2, d_3, \ldots, d_W\}$, the number of single carriers is 4 during data transmission, and the time domain length is 3 ms, the number of columns in the matrix generated by the channel interleaving is 36, and the number of rows is 4.

Figure 6:
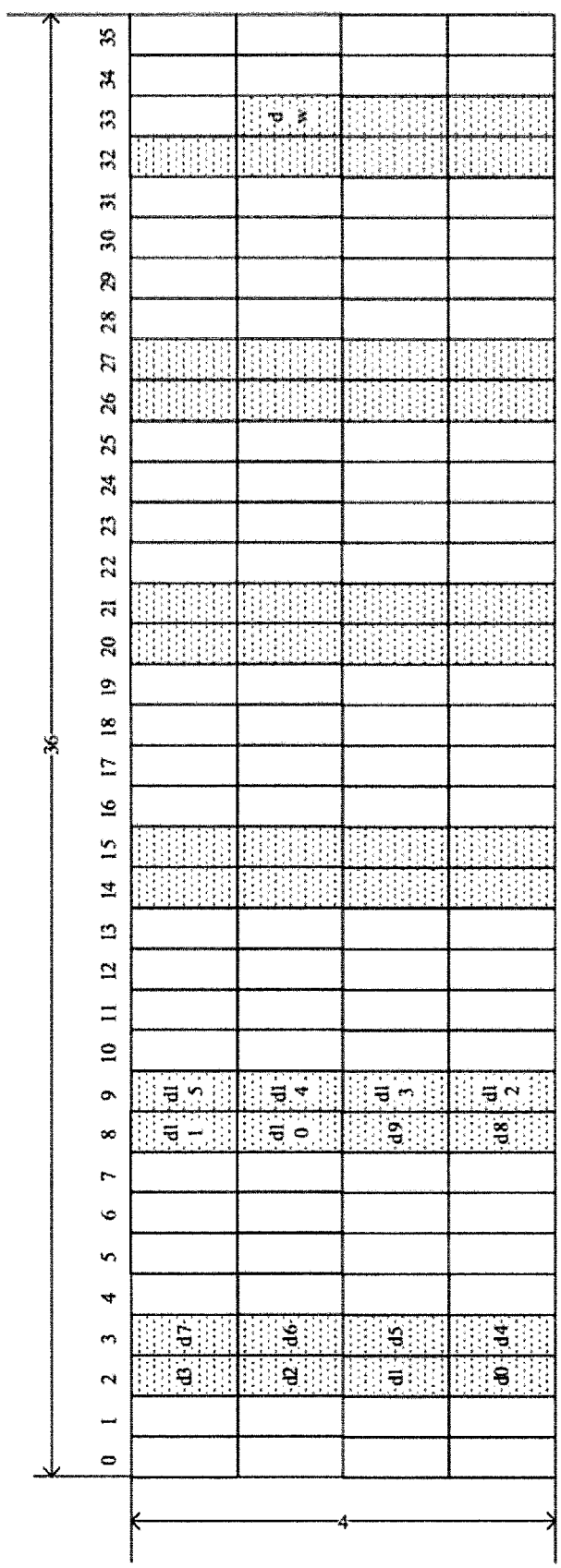
FIG. 6 is schematic diagram (1) based on the HARQ-ACK sequence mapping in the present embodiments.

Channel interleaving in the PUSCH maps encoded HARQ-ACK sequences in the order of column then row to predefined positions in the channel interleaving matrix; suppose Y=0, wherein the predefined position is in column $\{K(j')+12*i\}$ of the channel interleaving matrix in the PUSCH format, wherein the value of i is 0, 1, and 2, the value of K(j') is 2, 3, 8, 9, the value of j' is 1, 2, 3, 4, and the encoded HARQ-ACK sequence is, according to the order of row then column, sequentially mapped to {2, 3, 8, 9, 14, 15, 20, 21, 26, 27, 32, 33} in the matrix. Specifically, this mapping is shown in FIG. 6, where FIG. 6 is schematic diagram (1) based on the HARQ-ACK sequence mapping in the present embodiments;

Ex. 4, Embodiment 2

Suppose that if HARQ-ACK and uplink data are simultaneously transmitted, the modulation sequence corresponding to HARQ-ACK is $\{d_0, d_1, d_2, d_3, \ldots, d_W\}$, the number of single carriers is 4 during data transmission, and the time domain length is 3 ms, the number of columns in the matrix generated by the channel interleaving is 36, and the number of rows is 4;

Channel interleaving in the PUSCH maps encoded HARQ-ACK sequences in the order of row then column to predefined positions in the channel interleaving matrix; suppose Z=0, wherein the predefined position is in column $\{K(j')+12*i\}$ of the channel interleaving matrix in the PUSCH format, wherein the value of i is 0 and 1, the value of K(j') is 2, 3, 8, 9, the value of j' is 1, 2, 3, 4, and the encoded HARQ-ACK sequence is, according to the order of column then row, sequentially mapped to {2, 3, 8, 9, 14, 15, 20, 21, 26, 27, 32, 33} in the matrix. Specifically, this mapping is shown in FIG. 7, where FIG. 7 is schematic diagram (2) based on the HARQ-ACK sequence mapping in the present embodiments;

Ex. 4, Embodiment 3

Suppose that if HARQ-ACK and uplink data are simultaneously transmitted, the modulation sequence corresponding to HARQ-ACK is $\{d_0, d_1, d_2, d_3, \ldots, d_W\}$, the number of single carriers is 3 during data transmission, and the time domain length is 4 ms, then the number of columns in the matrix generated by the channel interleaving is 48, and the number of rows is 3;

Channel interleaving in the PUSCH maps encoded HARQ-ACK sequences in the order of row then column to predefined positions in the channel interleaving matrix; suppose Z=0, wherein the predefined position is in column $\{K(j')+12*i\}$ of the channel interleaving matrix in the PUSCH format, wherein the value of i is 0, 2, 1, 3, the value of K(j') is 2, 3, 8, 9, the value of j' is 1, 2, 3, 4, and the encoded HARQ-ACK sequence is, according to the order of column then row, sequentially mapped to {2, 3, 8, 9, 26, 27, 32, 33, 14, 15, 20, 21, 38, 39, 44, 45} in the matrix. Specifically, this mapping is shown in FIG. 8, where FIG. 8 is schematic diagram (3) based on the HARQ-ACK sequence mapping in the present embodiments;

Ex. 4, Embodiment 4

Suppose that if HARQ-ACK and uplink data are simultaneously transmitted, the modulation sequence corresponding to HARQ-ACK is $\{d_0, d_1, d_2, d_3, \ldots, d_W\}$, the number of single carriers is 3 during data transmission, and the time domain length is 4 ms, then the number of columns in the matrix generated by the channel interleaving is 48, and the number of rows is 3;

Channel interleaving in the PUSCH maps encoded HARQ-ACK sequences in the order of row then column to predefined positions in the channel interleaving matrix; suppose Z=0, wherein the predefined position is in column $\{K(j')+12*i\}$ of the channel interleaving matrix in the PUSCH format, wherein the value of i is 0, the value of K(j') is 1, 2, 3, 4, 5, 6, 7, 8, 9, 10, 11, 12, the value of j' is 1, 2, 3, 4, 5, 6, 7, 8, 9, 10, 11, 12, and the encoded HARQ-ACK sequence is, according to the order of column then row, sequentially mapped to {1, 2, 3, 4, 5, 6, 7, 8, 9, 10, 11, 12} in the matrix;

Ex. 4, Embodiment 5

Suppose that if HARQ-ACK and uplink data are simultaneously transmitted, the modulation sequence corresponding to HARQ-ACK is $\{d_0, d_1, d_2, d_3, \ldots, d_W\}$, the number of single carriers is 3 during data transmission, and the time domain length is 4 ms, then the number of columns in the matrix generated by the channel interleaving is 48, and the number of rows is 3;

Channel interleaving in the PUSCH maps encoded HARQ-ACK sequences in the order of row then column to predefined positions in the channel interleaving matrix; suppose Z=0, wherein the predefined position is in column $\{K(j')+12*i\}$ of the channel interleaving matrix in the PUSCH format, wherein the value of i is 0, the value of K(j') is 1, 2, 3, 4, 5, 6, the value of j' is 1, 2, 3, 4, 5, 6, and the encoded HARQ-ACK sequence is, according to the order of column then row, sequentially mapped to {1, 2, 3, 4, 5, 6} in the matrix;

EXAMPLE 5

Ex. 5, Embodiment 1

Figure 9:
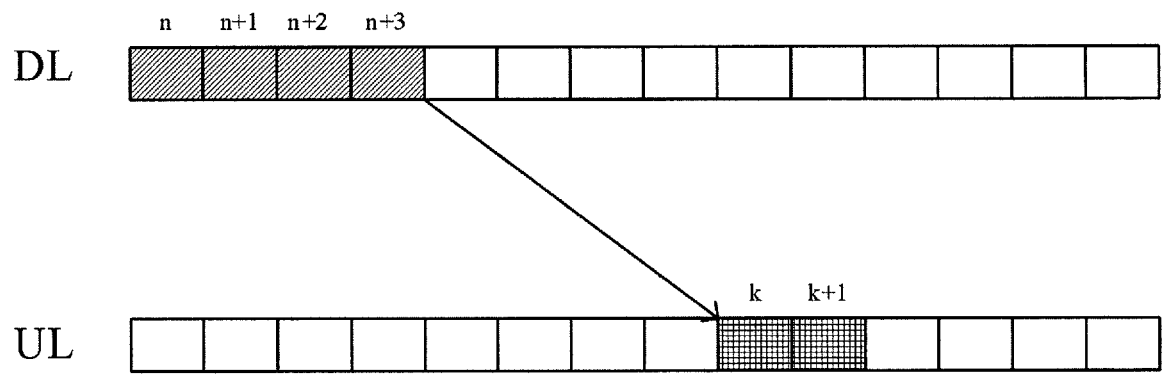
FIG. 9 is a schematic diagram (1) based on the transmission of HARQ-ACK response information in the present embodiments.

Assume that the terminal receives the downlink data information in the downlink subframe {n, . . . , n+3} and transmits the HARQ-ACK response information that corresponds to the downlink information in the uplink subframe {k, . . . , k+1};

Since k=n+4*X and X=2, the corresponding HARQ-ACK response information is transmitted in the subframe {n+8, n+9}; as is shown in FIG. 9, where FIG. 9 is a schematic diagram (1) based on the transmission of HARQ-ACK response information in the present embodiments;

Ex. 5, Embodiment 2

Figure 10:
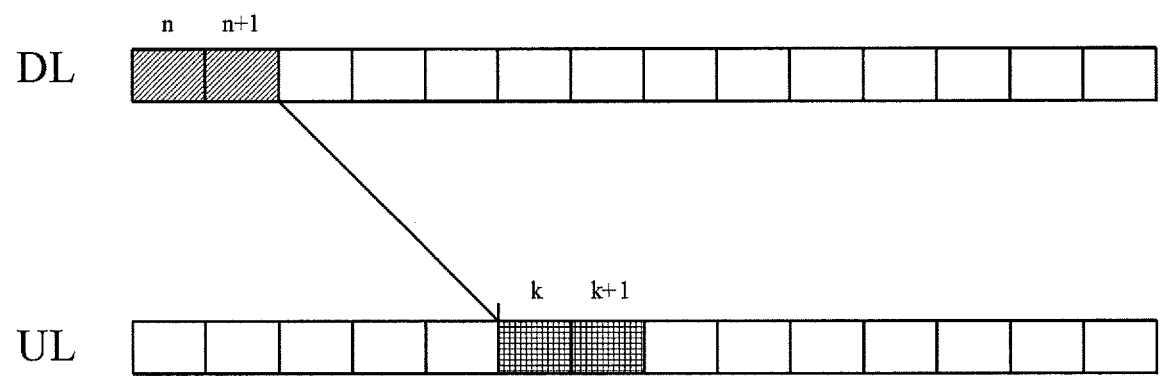
FIG. 10 is a schematic diagram (2) based on the transmission of HARQ-ACK response information in the present embodiments.

Assume that the terminal receives the downlink data information in the downlink subframe {n, . . . , n+1} and transmits the HARQ-ACK response information that corresponds to the downlink information in the uplink subframe {k, . . . , k+1};

Since k=n+M+4 and M=1, the corresponding HARQ-ACK response information is transmitted in the subframe {n+5, n+6}; as is shown in FIG. 10, where FIG. 10 is a schematic diagram (2) based on the transmission of HARQ-ACK response information in the present embodiments;

Ex. 5, Embodiment 3

Figure 11:
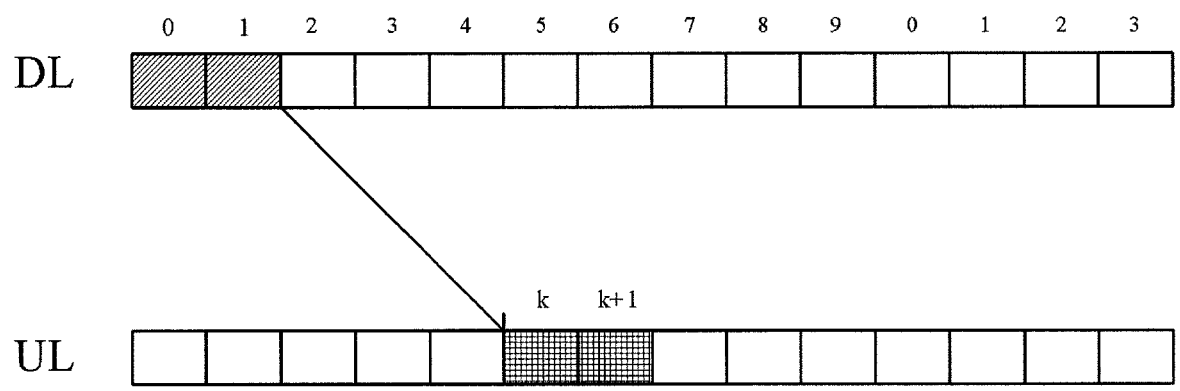
FIG. 11 is a schematic diagram (3) based on the transmission of HARQ-ACK response information in the present embodiments.

Assume that the terminal receives the downlink data information in the downlink subframe {0,1} and transmits the HARQ-ACK response information that corresponds to the downlink information in the uplink subframe {k, . . . , k+1};

Since k has undergone signal configuration through the indication control domain of the DL DCI and the terminal has obtained k≤5 through the indication control domain, the corresponding HARQ-ACK response information is transmitted in the subframe {5, 6}; as is shown in FIG. 11, where FIG. 11 is a schematic diagram (3) based on the transmission of HARQ-ACK response information in the present embodiments, wherein the size of the first indication control field is H bits, and H is an integer greater than 0.

Ex. 5, Embodiment 4

Figure 12:
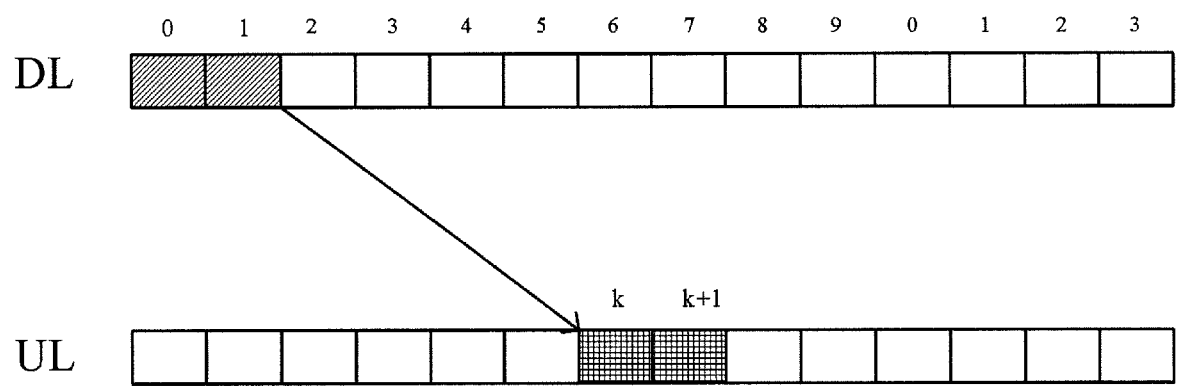
FIG. 12 is a schematic diagram (4 based on the transmission of HARQ-ACK response information in the present embodiments.

Assume that the terminal receives the downlink data information in the downlink subframe {0,1} and transmits the HARQ-ACK response information that corresponds to the downlink information in the uplink subframe {k, . . . , k+1};

Since k has undergone signal configuration through the indication control domain of the DL DCI and the preset subframe index of subframe k is an integer multiple of X, and the terminal has obtained k=5 through the indication control domain; and since the preset subframe index corresponding to subframe 5 is not an integer multiple of two (the preset subframe index is obtained through the subframe sequence number, which begins at subframe g; in the present embodiment, since the preset subframe g is subframe 0, the preset subframe index is numbered from 0, and subframes that are integer multiples of X are subframes with the index 0, 2, 4, 6, 8), the corresponding HARQ-ACK response information is transmitted in the subframe {6, 7}; as is shown in FIG. 12, where FIG. 12 is a schematic diagram (4) based on the transmission of HARQ-ACK response information in the present embodiments, wherein the size of the first indication control field is H bits, and H is an integer greater than 0. It is also possible that the base station, when it configures k, can take into consideration the fact that the preset subframe index of subframe k is an integer multiple of X, and configure k to equal 6.

Ex. 5, Embodiment 5

Figure 13:
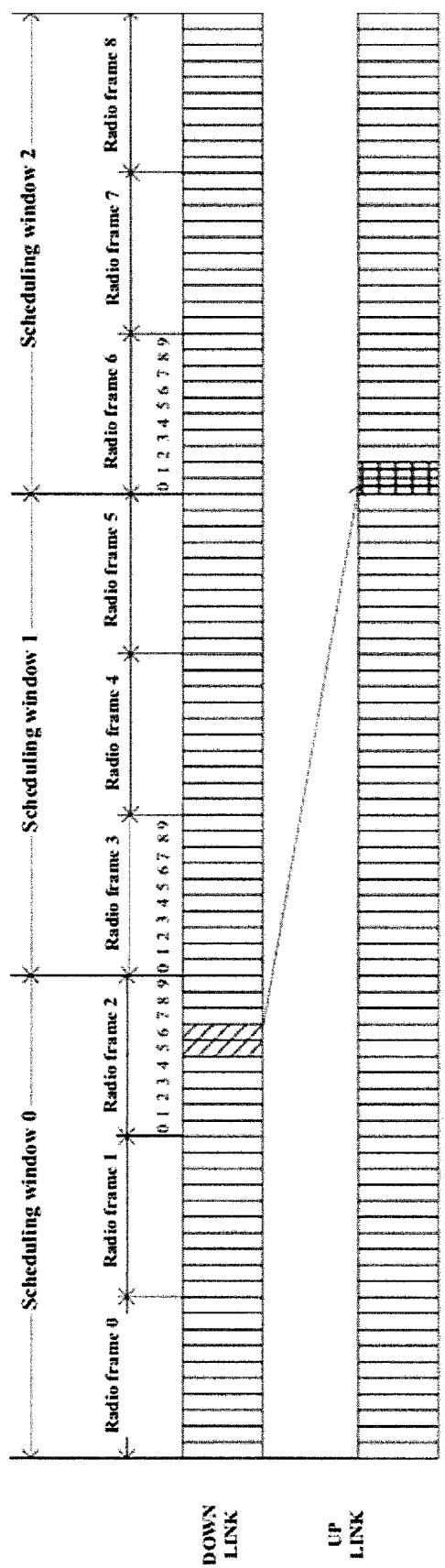
FIG. 13 is a schematic diagram (5) based on the transmission of HARQ-ACK response information in the present embodiments.

Assuming that the scheduling window length is 30 ms, and that the terminal receives the downlink information at scheduling window 0 in the downlink subframe {5,6} in radio frame 2 and transmits the HARQ-ACK response information that corresponds to the downlink information in the uplink subframe {k, . . . , k+1};

Since the value of k is determined by the scheduling window of the downlink information and the downlink information is at scheduling window t, the uplink subframe k is located within scheduling window t+2, and the position within the scheduling window is the initial position of the scheduling window; thus the terminal transmits HARQ-ACK response information at radio frame 6 sub frame {0,1} corresponding to the beginning of scheduling window 2; as is shown in FIG. 13, where FIG. 13 is a schematic diagram (5) based on the transmission of HARQ-ACK response information in the present embodiment; or the terminal transmits HARQ-ACK response information at radio frame 6 sub frame {0,1} corresponding to the beginning of scheduling window 1.

Ex. 5, Embodiment 6

Figure 14:
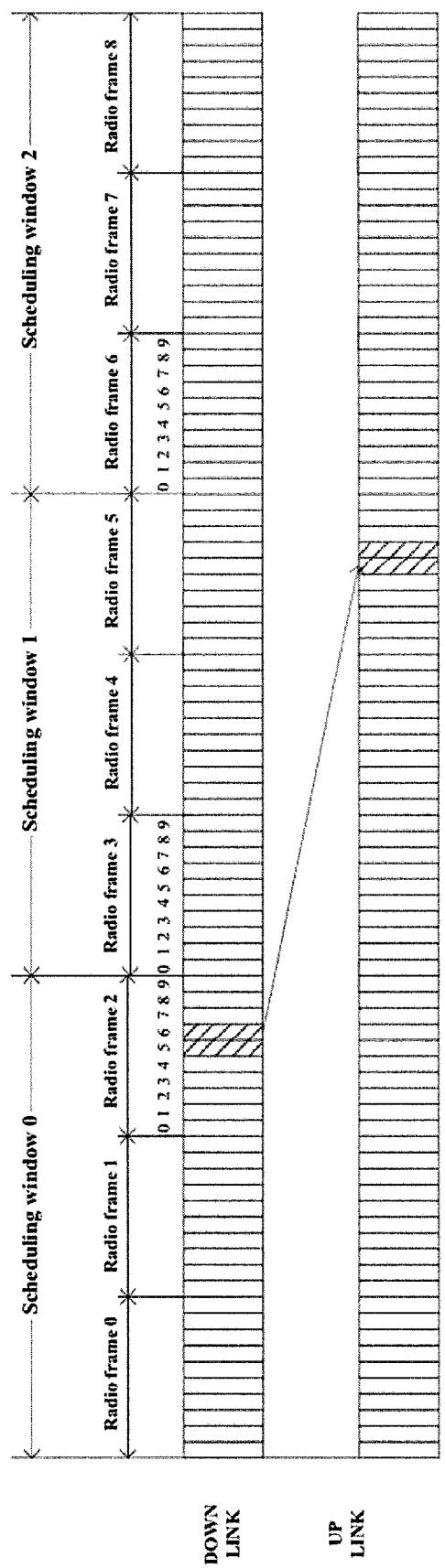
FIG. 14 is a schematic diagram (6) based on the transmission of HARQ-ACK response information in the present embodiments.

Assuming that the scheduling window length is 30 ms, and that the terminal receives the downlink information at scheduling window 0 in the downlink subframe {5,6} in radio frame 2 and transmits the HARQ-ACK response information that corresponds to the downlink information in the uplink subframe {k, . . . , k+1};

Since the value of k is determined by the scheduling window of the downlink information and the downlink information is at scheduling window t, the uplink subframe k is located within scheduling window t+1 and the position within the scheduling window is determined by the initial position of the scheduling window and the first offset, wherein the first offset is determined by the position of the downlink information within the scheduling window; thus the terminal transmits HARQ-ACK response information at radio frame 5 sub frame {5,6} corresponding to the beginning of scheduling window 1; as is shown in FIG. 14, where FIG. 14 is a schematic diagram (6) based on the transmission of HARQ-ACK response information in the present embodiments;

Ex. 5, Embodiment 7

Assuming that the scheduling window length is 30 ms, and that the terminal receives the downlink information at scheduling window 0 in the downlink subframe {5,6} in radio frame 2 and transmits the HARQ-ACK response information that corresponds to the downlink information in the uplink subframe {k, . . . , k+1};

Since the value of k is determined by the scheduling window of the downlink information and the downlink information is at scheduling window t, the uplink subframe k is located within scheduling window t+1, and the position within the scheduling window is determined by the initial position of the scheduling window and the first offset, and since the preset subframe index of subframe k is an integer multiple of X, wherein the first offset is determined by the position of the downlink information within the scheduling window; thus the terminal transmits HARQ-ACK response information at radio frame 5 sub frame {5,6} corresponding to the beginning of scheduling window 1, and since the preset subframe index corresponding to subframe 5 is not an integer multiple of two (the preset subframe index is obtained through the subframe sequence number, which begins at subframe g; in the present embodiment, since the preset subframe g is the initial subframe for scheduling window 1 (i.e., radio subframe 3, subframe 0), the preset subframe index is numbered from radio frame 3, subframe 0; thus subframes that are integer multiples of X are subframes 3, 4, 5 with the subframe index of 0, 2, 4, 6, 8), the terminal transmits the HARQ-ACK response information at the subframe {6, 7} in radio subframe 5 corresponding to scheduling window 1; alternatively, when the base station is scheduling PDSCH, it can take into consideration the fact that the transmission of HARQ-ACK response information must satisfy the requirement that the preset subframe index of the initial subframe k must be an integer multiple of x; the base station can then transmit downlink data information in the downlink subframe {6,7} in the radio subframe 2 at scheduling window 0, and the terminal can transmit HARQ-ACK response information at {5,6} in radio subframe 5 at scheduling window 1.

Ex. 5, Embodiment 8

Figure 15:
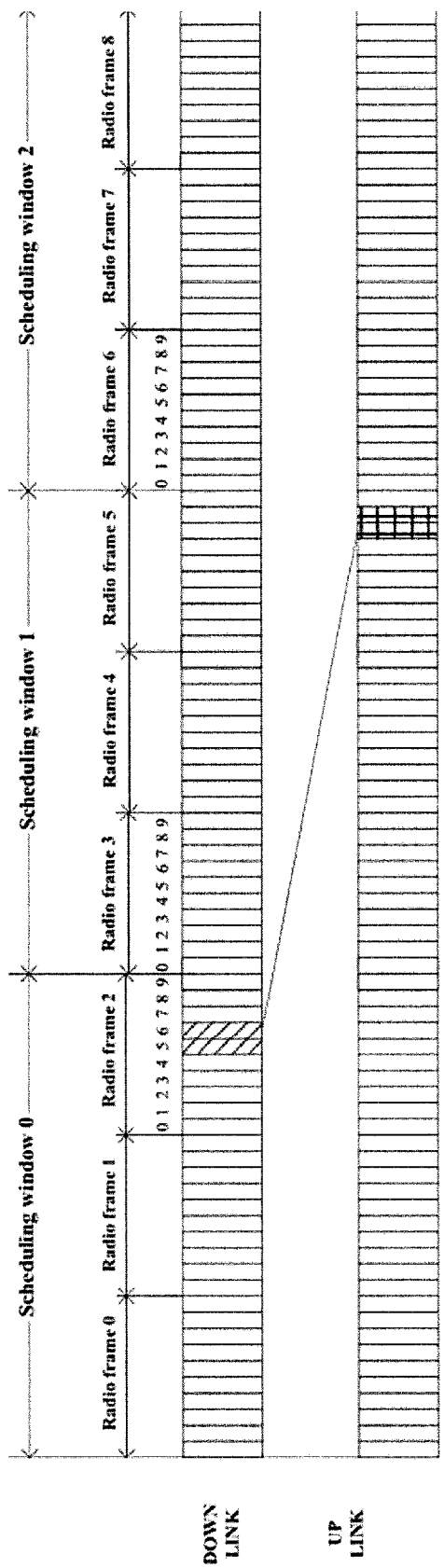
FIG. 15 is a schematic diagram (7) based on the transmission of HARQ-ACK response information in the present embodiments.

Assuming that the scheduling window length is 30 ms, and that the terminal receives the downlink information at scheduling window 0 in the downlink subframe {5,6} in radio frame 2 and transmits the HARQ-ACK response information that corresponds to the downlink information in the uplink subframe {k, . . . , k+1};

Since the value of k is determined by the scheduling window of the downlink information and the downlink information is at scheduling window t, the uplink subframe k is located within scheduling window t+1 and the position within the scheduling window is determined by the initial position of the scheduling window and the first offset, wherein the first offset is determined by the position of the downlink information within the scheduling window and the second offset, with the second offset signaling, the signaling being the second indication control field in the DCI corresponding to the downlink data. Since the value of the second indication control field is 01, the second offset is obtained based on the relationship between the second predefined indication control field and the second offset. Table 3 shows the relationship between the second indication control field and the second offset, wherein the second offset shifts two subframes backward and the terminal transmits HARQ-ACK response information at subframe {7, 8} in radio frame 5 at scheduling window 1; as is shown in FIG. 15, where FIG. 15 is a schematic diagram (7) based on the transmission of HARQ-ACK response information in the present embodiments;

TABLE 3

| second Indication Control Field | second Offset |
| --- | --- |
| 00 | No offset |
| 01 | Backward offset by N subframes |
| 10 | Backward offset by 2N subframes |
| 11 | Forward offset by N subframes |

Wherein N is equal to 1 subframe or is equal to X subframes. Table 1[1] is only an illustration, and all such illustrations that describe second offsets indicated by the second indication control field fall under the protection of the present embodiments, i.e., Table 4, which describes the relationship between the second indication control field and the second offset.

[1] Translator's note: "Table 1" in original

TABLE 4

| second Indication Control Field | second Offset |
| --- | --- |
| 00 | No offset |
| 01 | Forward offset by N frames |
| 10 | Forward offset by 2N frames |
| 11 | Backward offset by N frames |

Ex. 5, Embodiment 8

Figure 16:
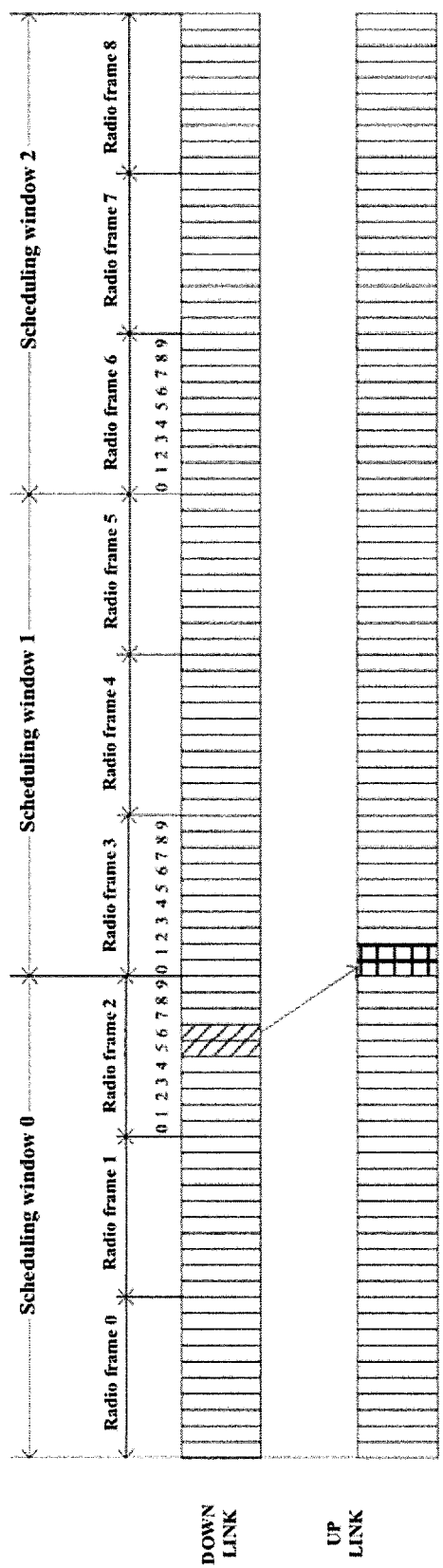
FIG. 16 is a schematic diagram (8) based on the transmission of HARQ-ACK response information in the present embodiments.

Assuming that the scheduling window length is 30 ms, and that the terminal receives the downlink information at scheduling window 0 in the downlink subframe {5,6} in radio frame 2 and transmits the HARQ-ACK response information that corresponds to the downlink information in the uplink subframe {k, . . . , k+1}; Since the value of k is determined by the scheduling window of the downlink information and the position of subframe n+M within the scheduling window, if subframe n+M is located before subframe L within scheduling window t, then the uplink subframe k is located at scheduling window t+1, otherwise the uplink subframe k is located at scheduling window t+2; wherein it is assumed that its position within the scheduling window is the initial position of the scheduling window, with L=3; since the downlink subframe 6 is located before subframe 3 at scheduling window 0 in radio frame 2, the corresponding subframe 0 in radio frame 3 begins to transmit the HARQ-ACK at the beginning of scheduling window 1; as is shown in FIG. 16 where FIG. 16 is a schematic diagram (8) based on the transmission of HARQ-ACK response information in the present embodiments;

EXAMPLE 6

Suppose the terminal must transmit HARQ-ACK at subframe {n+e, . . . , n+f}, and must transmit uplink data at subframe {n+g, . . . , n+v}, wherein e, f, g, v are integers greater than or equal to 0.

Ex. 6, Embodiment 1

If subframe n+g is located between subframe n+e and subframe n+f, the terminal does not transmit uplink data;

Ex. 6, Embodiment 2

Since subframe n+e is located between subframe n+g and n+v, the terminal will begin the HARQ-ACK transmission from subframe n+e;

Ex. 6, Embodiment 3

Since subframe n+e is located between subframe n+g and n+v, the terminal will begin mapping the HARQ-ACK onto the data for transmission from subframe n+e;

Ex. 6, Embodiment 4

Since subframe n+e is located between subframe n+g and n+v, the terminal will begin transmitting HARQ-ACK and uplink data from subframe n+e; or, the terminal will begin transmitting HARQ-ACK and uplink data from subframe n+g;

Ex. 6, Embodiment 5

Since subframe n+g is located between subframe n+e and n+f, the terminal will begin transmitting HARQ-ACK and uplink data from subframe n+e; or, the terminal will begin transmitting HARQ-ACK and uplink data from subframe n+g.

With this description of the present embodiments, it will be apparent to anyone skilled in the art that the methods of the present embodiments can be implemented with the aid of software and the required hardware platform; of course, hardware can also be used, but in many cases the use of a hardware platform is a better method. In light of this, the contributions of the present embodiments take the shape of software products, either essentially or in addition to the prior art, which can be stored in storage mediums (e.g., ROM/RAM, magnetic disk, or optical disk), including a few instructions on how to make terminal equipment (e.g., cell phone, computer, server, or network equipment, etc.) in order to implement the methods of the present embodiments.

Figure 17:
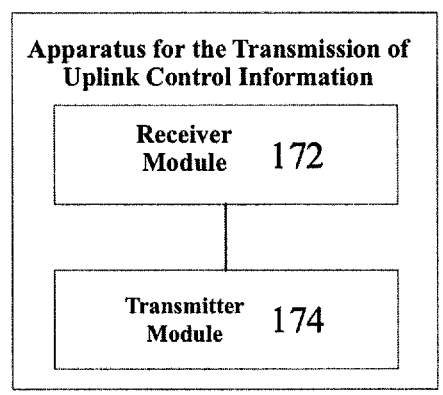
FIG. 17 is a block diagram based on the format of the uplink control information transmission apparatus in the current embodiments.

The embodiments of the present disclosure also describe an apparatus for the transmission of uplink control information used to implement the embodiments with the optimal methods; what has already been explained will not be discussed further. As used herein, the term "module" may refer to a combination of software and/or hardware with a set function. Although the apparatus described herein is better implemented with software, the use of hardware for implementation, or the use of a combination of hardware and software for implementation is also conceivable.

FIG. 17 is a block diagram based on the format of the uplink control information transmission apparatus in the current embodiments. As FIG. 17 shows, the apparatus comprises a receiver module 172 and a transmitter module 174, as described below:

Receiver module 172 is set up to receive downlink information; transmitter module 174 is connected to the receiver module 172 and is set up use the PUSCH format to transmit a HARQ-ACK corresponding to the downlink information.

The PUSCH format can comprise many formats. An explanation of the distinction between varying PUSCH formats is provided below:

In an alternative embodiment, when only HARQ-ACK is transmitted, the encoding mode within the PUSCH format is repetition code.

In another alternative embodiment, when only HARQ-ACK is transmitted, the modulation mode within the PUSCH format is preset binary phase-shift keying (BPSK) modulation or quadrature phase-shift keying (QPSK) modulation.

Alternatively, the preset BPSK comprises: first position element modulations with a constellation point of $\{1, -1\}$, and second position element modulations with a constellation point of $\{j, -j\}$, wherein the first position elements comprise elements with an even-numbered position in the modulation sequence, and the second position elements comprise elements with an odd-numbered position in the modulation sequence, OR wherein the first position elements comprise elements with an odd-numbered position in the modulation sequence, and the second position elements comprise elements with an even-numbered position in the modulation sequence.

Alternatively, when only HARQ-ACK is transmitted, the PUSCH format has a time domain of X milliseconds (ms) and the frequency domain of a single subcarrier.

Alternatively, the value of the X is predetermined, wherein that predetermined value is 2 ms, 3 ms, or 4 ms; or larger than 1 ms and a multiple or divisor of 12; or, corresponding to the shortest time domain length of the physical downlink shared channel (PDSCH); or, the shortest time domain length of the PUSCH that is only transmitting data; or, corresponding to the shortest time domain length for single carrier PUSCH transmission; or, the value of the signaling indicators, wherein such signaling indicators include at least one of the following: system information block (SIB) signaling; radio resource control (RRC) signaling; DCI corresponding to the PUSCH; DCI corresponding to the PDSCH.

Alternatively, the frequency domain position of a single subcarrier is predetermined; or is indicated by the signaling indicators, wherein such signaling indicators include at least one of the following: SIB signaling; RRC signaling; DCI corresponding to the PUSCH; DCI corresponding to the PDSCH.

Alternatively, when HARQ-ACK and scheduling request (SR) are simultaneously transmitted, PUSCH will first concatenate HARQ-ACK and SR before encoding them.

Alternatively, when HARQ-ACK and SR are simultaneously transmitted, PUSCH will employ the first scrambling sequence; when only HARQ-ACK is transmitted, PUSCH will employ the second scrambling sequence.

Alternatively, when HARQ-ACK and uplink data are simultaneously transmitted, the PUSCH channels are interleaved as follows: the encoded HARQ-ACK sequence is mapped to a predefined position on the channel interleaving matrix according to the order of column then row; or, the encoded HARQ-ACK sequence is mapped to a predefined position on the interleaving matrix according the order of row then column.

Alternatively, the mapping of the encoded HARQ-ACK sequence to a predefined position on the interleaving matrix in the order of column then row comprises: starting at the Y column and using the order of column then row to map the HARQ-ACK sequence to a predefined position on the interleaving matrix, wherein Y is an integer greater than or equal to 0.

Alternatively, the mapping of the encoded HARQ-ACK sequence to a predefined position on the interleaving matrix in the order of row then column comprises: starting at the Z column and using the order of row then column to map the encoded HARQ-ACK sequence to a predefined position on the interleaving matrix, wherein Z is an integer greater than or equal to 0.

Alternatively, the predefined position is the column (K (j')+12*i) within the interleaving matrix within the PUSCH format, wherein the columns are positive integers, and i and j' are integers greater than or equal to 0.

Alternatively, the value of i is equal to 0, 1, ..., N−1; or, i is equal to 0, cell (N/2), 1, cell(N/2)+1,2, cell(N/2)+1,2, cell(N/2)+2, ..., cell (N/2)−1, N−1; or, i is equal to 0, 1, ..., N−1 of any value; N is equal to the number of orthogonal frequency division multiplexing (OFDM) symbols corresponding to the PUSCH format divided by 12 and then rounded up to the next whole integer, the value of K (j') is equal to 2, 3, 8, 9, wherein the value of j' is 1, 2, 3, 4 or, 1, 3, 2, 4; or the value of K (j') is equal to 1, 2, 3, 4, 5, 6, wherein the value of j' is 1, 2, 3, 4, 5, 6; or the value of K (j') is equal to 1, 2, 3, 4, 5, 6, 7, 8, 9, 10, 11, 12, wherein the value j' is 1, 2, 3, 4, 5, 6, 7, 8, 9, 10, 11, 12.

It should be noted that the few types of PUSCH format comprise only a few examples; PUSCH formats can be defined based on specific circumstances, and are not enumerated exhaustively herein.

Alternately, the receiver module 172 can comprise a receiver unit configured to receive downlink information in the downlink subframe $\{n, \ldots, n+M\}$; the transmitter module 174 can comprise a transmitter unit configured to transmit HARQ-ACK corresponding to the downlink information in the uplink subframe $\{k, \ldots, k+X-1\}$, wherein n is an integer greater than or equal to 0, and M is an integer greater than or equal to 0.

Alternatively, the value of k comprises one of the following: k=n+4*X; k=n+M+4; the value of k is determined by at least one of the following: the scheduling window of the downlink information, the position of the downlink information within the scheduling window, the signaling configuration.

Alternatively, the preset subframe index corresponding to the uplink subframe k is an integer multiple of X.

Alternatively, when the value of k is determined by the scheduling window of the downlink information, and the downlink information is at scheduling window t, the uplink subframe k is located at scheduling window t+2; or, when the value of k is determined by the scheduling window of the downlink information, and the downlink information is at scheduling window t, the uplink subframe k is located at scheduling window t+1; or, when the value of k is determined by the scheduling window of the downlink information and the position of subframe n+M within the scheduling window, if the position of subframe n+M is located before subframe L in scheduling window t, then the uplink subframe k is located at scheduling window t+1, or else it is located at scheduling window t+2; wherein, t is an integer greater than or equal to 0, and L is a preset positive integer.

Alternatively, the uplink subframe k that is located within the scheduling window comprises: k is a subframe corresponding to the start of the scheduling window; or, k is composed of a subframe corresponding to the start of the scheduling window plus the first offset, wherein the first offset is determined by at least one of the following: the position of the downlink information within the scheduling window, the value of X, or the second offset, with the second offset being configured by signaling.

It should be noted that the module can use either software or hardware for implementation; as for the latter, it can utilize, but is not limited to, the following method: situate the modules within the same processor, or, separate the modules into multiple processors.

The embodiments of the present disclosure also describe a storage medium. Alternatively, the storage medium of the present embodiments can be configured to store program code for the implementation of the following steps:

S1, receive downlink information;

S2, use the predefined PUSCH format to transmit HARQ-ACK corresponding to the downlink information.

Alternatively, the storage medium of the present embodiments can comprise, but not be limited to: U disk, Read-Only Memory (ROM), Random Access Memory (RAM), a removable hard disk, a magnetic disk, an optical disk, or any other type of memory that can store program code.

Alternatively, the processor of the present embodiments uses program code already stored in the storage medium to perform operations to carry out the methods outlined in the present embodiments.

Alternatively, the specific examples of the present embodiment may refer to the embodiments already described, or to the examples within those descriptions, and will not be further described.

It will be most apparent to those skilled in the craft that each module or each step of the present embodiments can be carried out with a general computing apparatus, and that they can be situated on the same computing apparatus, or can be dispersed over a network of multiple computing apparatus; alternatively, the modules and steps of the present embodiments can use program code that the computing apparatus implements, and thus can be stored on a storage medium from which they can be implemented by a computing apparatus, which in some cases will use a different sequence or different steps from those described herein, or will make them into different integrated circuit modules, or will turn the various modules and steps that exist among them into a single integrated circuit module. In this way, the present invention is not limited to any one combination of software and hardware.

What has been described here are only the optimal embodiments of the present invention, and are not meant to limit its claims. For those skilled in the related art, the present invention could undergo any number of alterations or changes. Any and all modifications, equivalent substitutions, improvements, etc., which are within the spirit and principles of the present embodiments, should be included within the scope of the present invention.

INDUSTRIAL APPLICABILITY

As is stated below, implementation of the present embodiments, which provides a method and apparatus for the transmission of uplink control information, has the following benefits: solves the problem in the related art of not being able to transmit HARQ-ACK on the PUSCH through its ability to transmit HARQ-ACK on the PUSCH.

What is claimed is:

1. A method for transmitting uplink control information, comprising:
    receiving downlink information; and
    based on the downlink information, transmitting a hybrid automatic repeat request-acknowledgment (HARQ-ACK) signal using a predefined physical uplink shared channel (PUSCH) format,
    wherein the predefined PUSCH format is only used to transmit the HARQ-ACK signal, and the predefined PUSCH format occupies only a single subcarrier along a frequency domain and extends across 2 milliseconds (ms) along a time domain.

2. The method of claim 1, wherein an encoding mode of the predefined PUSCH format is a repetition code.

3. The method of claim 1, wherein
    a modulation mode of the predefined PUSCH format is based on a preset binary phase-shift keying (BPSK) modulation.

4. The method of claim 1, wherein a position of the single subcarrier along the frequency domain is indicated by a Downlink Control Indicator (DCI) corresponding to the downlink information.

5. A method for transmitting uplink control information, comprising:
    receiving downlink information;
    based on the downlink information, determining whether to transmit a hybrid automatic repeat request-acknowledgment (HARQ-ACK) signal and a Scheduling Request (SR) simultaneously using a predefined physical uplink shared channel (PUSCH) format, wherein the predefined PUSCH format is provided based on a first scrambling sequence, or,
    transmit the HARQ-ACK signal only using the predefined PUSCH format, wherein the predefined PUSCH format is provided by a second scrambling sequence different from the first scrambling sequence and wherein the predefined PUSCH format occupies only a single subcarrier along a frequency domain and extends across 2 milliseconds (ms) along a time domain.

6. A wireless communication device comprising:
    a receiver configured to receive downlink information; and
    a transmitter configured to transmit a hybrid automatic repeat request-acknowledgment (HARQ-ACK) signal using a predefined physical uplink shared channel (PUSCH) format based on the downlink information,
    wherein the predefined PUSCH format is only used to transmit the HARQ-ACK signal, and the predefined PUSCH format occupies only a single subcarrier along a frequency domain and extends across 2 milliseconds (ms) along a time domain.

7. The wireless communication device of claim 6, wherein an encoding mode of the predefined PUSCH format is a repetition code.

8. The wireless communication device of claim 6, wherein a modulation mode of the predefined PUSCH format is based on a preset binary phase-shift keying (BPSK) modulation.

9. The wireless communication device of claim 6, wherein a position of the single subcarrier along the frequency domain is indicated by a Downlink Control Indicator (DCI) corresponding to the downlink information.

10. A wireless communication device, comprising:
a receiver configured to receive downlink information; and
a transmitter configured to, based on the downlink information, transmit a hybrid automatic repeat request-acknowledgment (HARQ-ACK) signal and a Scheduling Request (SR) simultaneously using a predefined physical uplink shared channel (PUSCH) format, wherein the predefined PUSCH format is provided based on a first scrambling sequence, or
transmit the HARQ-ACK signal only using the predefined PUSCH format, wherein the predefined PUSCH format is provided by a second scrambling sequence different from the first scrambling sequence, and wherein the predefined PUSCH format occupies only a single sub-carrier along a frequency domain and extends across 2 milliseconds (ms) along a time domain.

11. A non-transitory computer-readable medium having stored thereon computer-executable instructions for carrying out any one of claims 1, 2 through 5.

* * * * *